(12) United States Patent
Chen

(10) Patent No.: US 7,135,634 B2
(45) Date of Patent: Nov. 14, 2006

(54) MOUNTING DEVICE FOR A MICROPHONE

(75) Inventor: Chin-Chun Chen, Taipei (TW)

(73) Assignee: Yoga Electronics Co., Ltd., Taipei (TW)

( * ) Notice: Subject to any disclaimer, the term of this patent is extended or adjusted under 35 U.S.C. 154(b) by 14 days.

(21) Appl. No.: 10/930,012

(22) Filed: Aug. 30, 2004

(65) Prior Publication Data

US 2005/0262987 A1 Dec. 1, 2005

(30) Foreign Application Priority Data

May 28, 2004 (TW) .............................. 93208431 U

(51) Int. Cl.
 *G01G 3/00* (2006.01)
(52) U.S. Cl. ........................................................ 84/453
(58) Field of Classification Search ................ 381/355, 381/366, 374; 84/453; 181/158; 248/231.61–231.81
 See application file for complete search history.

(56) References Cited

U.S. PATENT DOCUMENTS 3,543,312 A 12/1970 Pofferi 6,305,654 B1 * 10/2001 Schmidt et al. ........ 248/231.61

OTHER PUBLICATIONS

U.S. Appl. No. 10/929,612, filed Aug. 30, 2004, Chen.

* cited by examiner

*Primary Examiner*—Kimberly Lockett
(74) *Attorney, Agent, or Firm*—Brinks Hofer Gilson & Lione

(57) ABSTRACT

A mounting device for mounting a microphone on a musical instrument includes a holder adapted to hold the microphone and having a rod, and a clamping unit. The clamping unit includes a seat mounted on the rod, a pair of spaced-apart first and second clamp arms which is adapted to clamp a peripheral edge of the musical instrument and which are converged to form a common connection part connected to the seat, a shaft extending through the first and second clamp arms and having one end portion extending outwardly of the first clamp arm, and a nut threadedly engaging the shaft to bias the first clamp arm toward the second clamp arm.

12 Claims, 5 Drawing Sheets

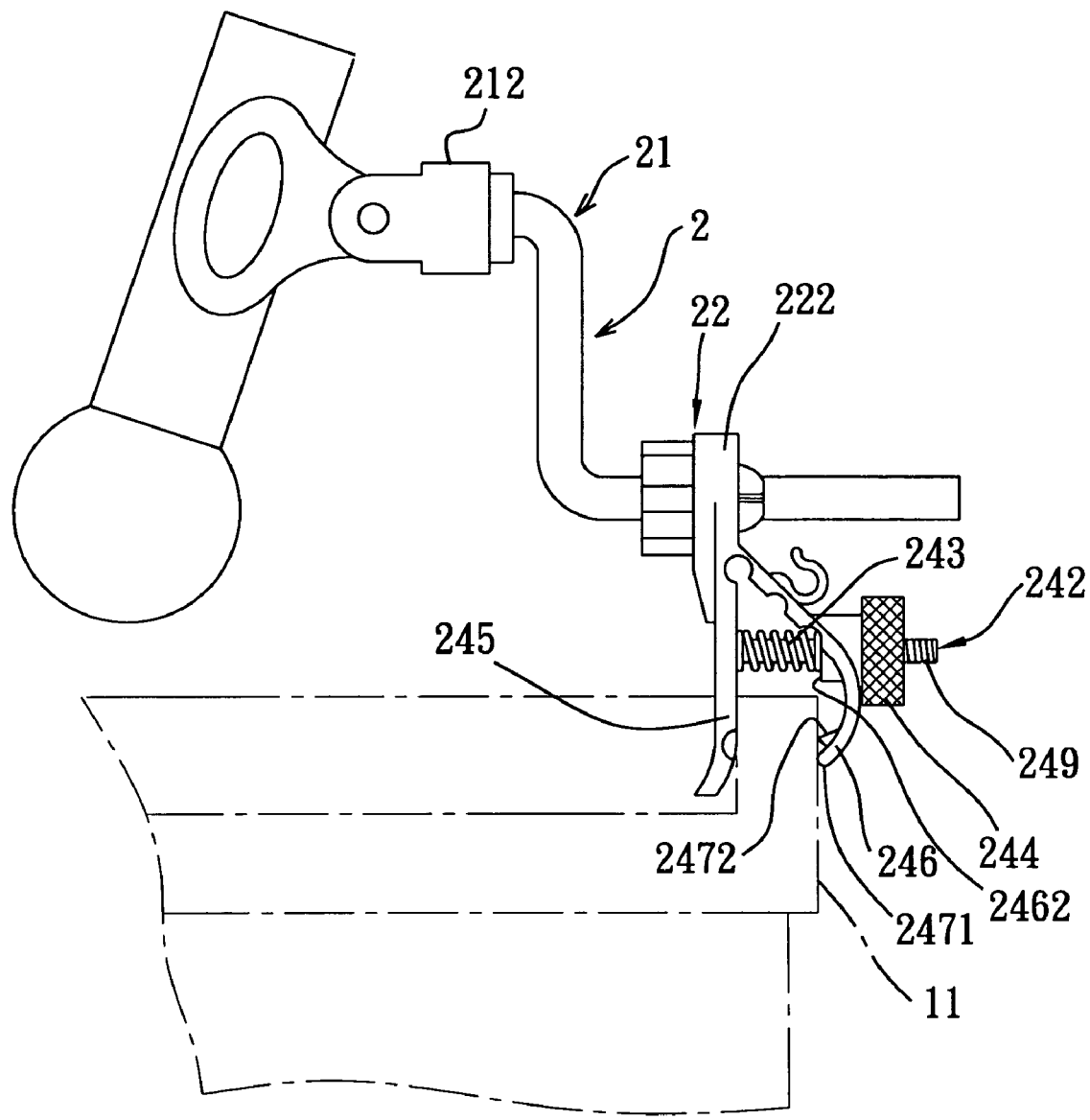
F I G. 4

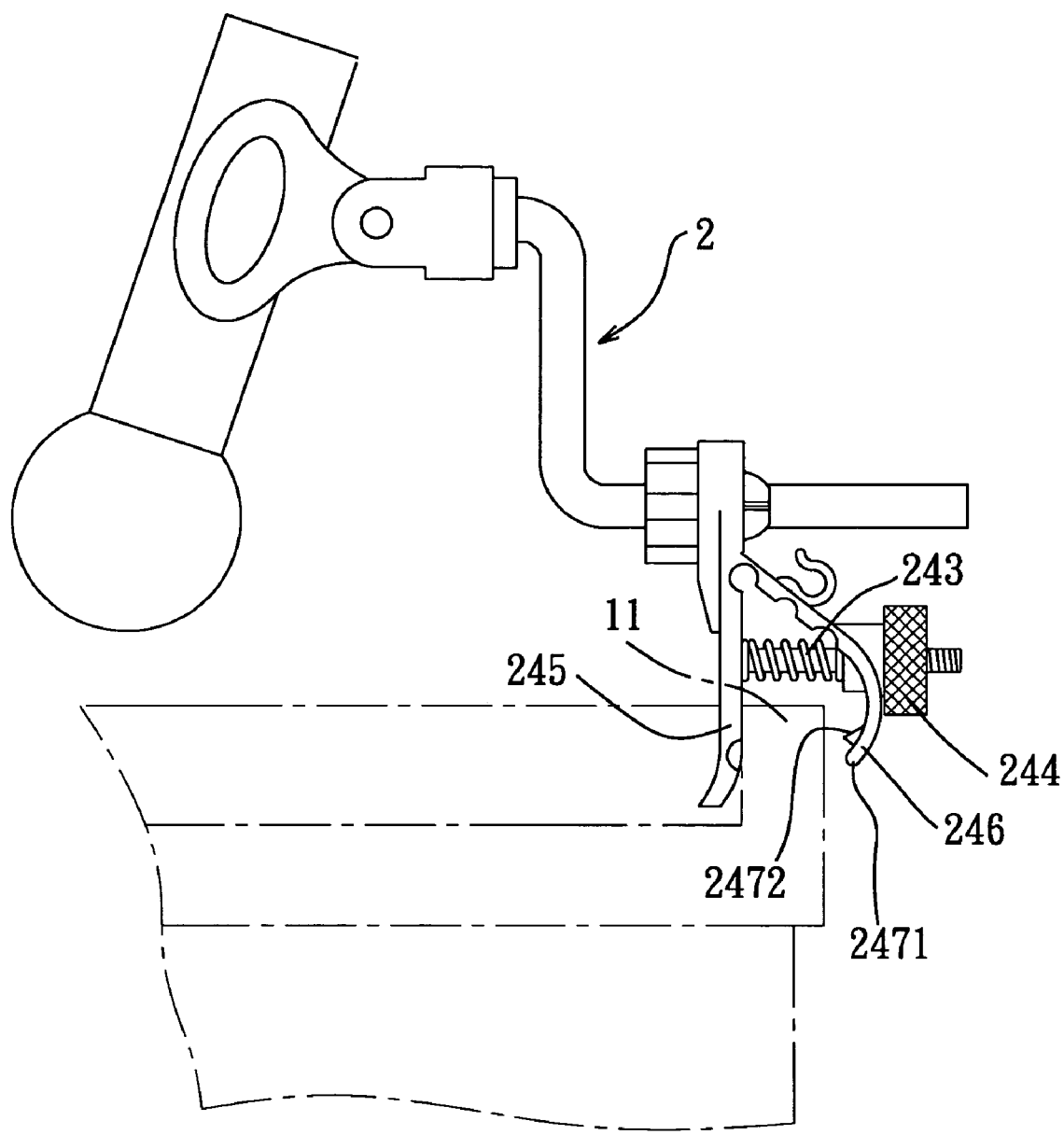
F I G. 5

MOUNTING DEVICE FOR A MICROPHONE

CROSS-REFERENCE TO RELATED APPLICATION

This application claims priority of Taiwanese Application No. 093208431, filed on May 28, 2004.

BACKGROUND OF THE INVENTION

1. Field of the Invention

The invention relates to a mounting device, more particularly to a mounting device for mounting a microphone on a musical instrument.

2. Description of the Related Art

When a band of drummers perform, microphones are usually mounted on stands at a height similar to the drums so as to capture the sounds and amplify them to be heard by the audience or to facilitate recording of the music. The stands are placed at fixed points and at significant distances from the drums so as not to get in the way of the drummers. However, this results in the limited capturing of the sounds by the microphones. Furthermore, these fixed-point-mounted microphones are not suitable for use when the drummers, with the drums strapped on their bodies, have to move from one point to another.

SUMMARY OF THE INVENTION

Therefore, the object of the present invention is to provide a mounting device that may be installed on a peripheral edge of a musical instrument so as to enable mounting of a microphone on top of the musical instrument in order to capture effectively the sound produced from the musical instrument.

According to one aspect of this invention, a mounting device is provided for mounting a microphone on a musical instrument having a peripheral edge. The mounting device comprises a holder adapted to hold the microphone and having a rod, and a clamping unit. The clamping unit includes a seat mounted on the rod, a pair of spaced-apart first and second clamp arms which is adapted to clamp the peripheral edge of the musical instrument and which are converged to form a common connection part connected to the seat, a shaft extending through the first and second clamp arms and having one end portion extending outwardly of the first clamp arm, and a nut threadedly engaging said one end portion of the shaft to bias the first clamp arm toward the second clamp arm. According to another aspect of this invention, an assembly comprises a holder having a rod, a seat mountable on the rod at a selected position, a locking unit, and a C-shaped friction ring. The seat includes a sleeve body which is sleeved movably around the rod and which has a plurality of axially extending split parts formed around the rod, and an external screw thread formed on outer surfaces of the split parts. The locking unit is disposed movably around the rod, and is engageable with the sleeve body to lock the sleeve body against movement. The locking unit includes a tubular member which can be sleeved around the split parts and which has an internal screw thread engageable with the external screw thread to lock the split parts against movement. The C-shaped friction ring is sleeved around the rod between the sleeve body and the tubular member, and has one end engaging the split parts. The tubular member embraces the friction ring and the split parts when the internal and external screw threads are interengaged.

BRIEF DESCRIPTION OF THE DRAWINGS

Other features and advantages of the present invention will become apparent in the following detailed description of the preferred embodiment with reference to the accompanying drawings, of which:

FIG. 4 is a fragmentary schematic side view of the preferred embodiment, illustrating how the clamping unit clamps a peripheral edge of a drum; and FIG. 5 is a view similar to FIG. 4, but illustrating how the clamping unit is loosened from the peripheral edge of the drum.

DETAILED DESCRIPTION OF THE PREFERRED EMBODIMENT

Figure 1:
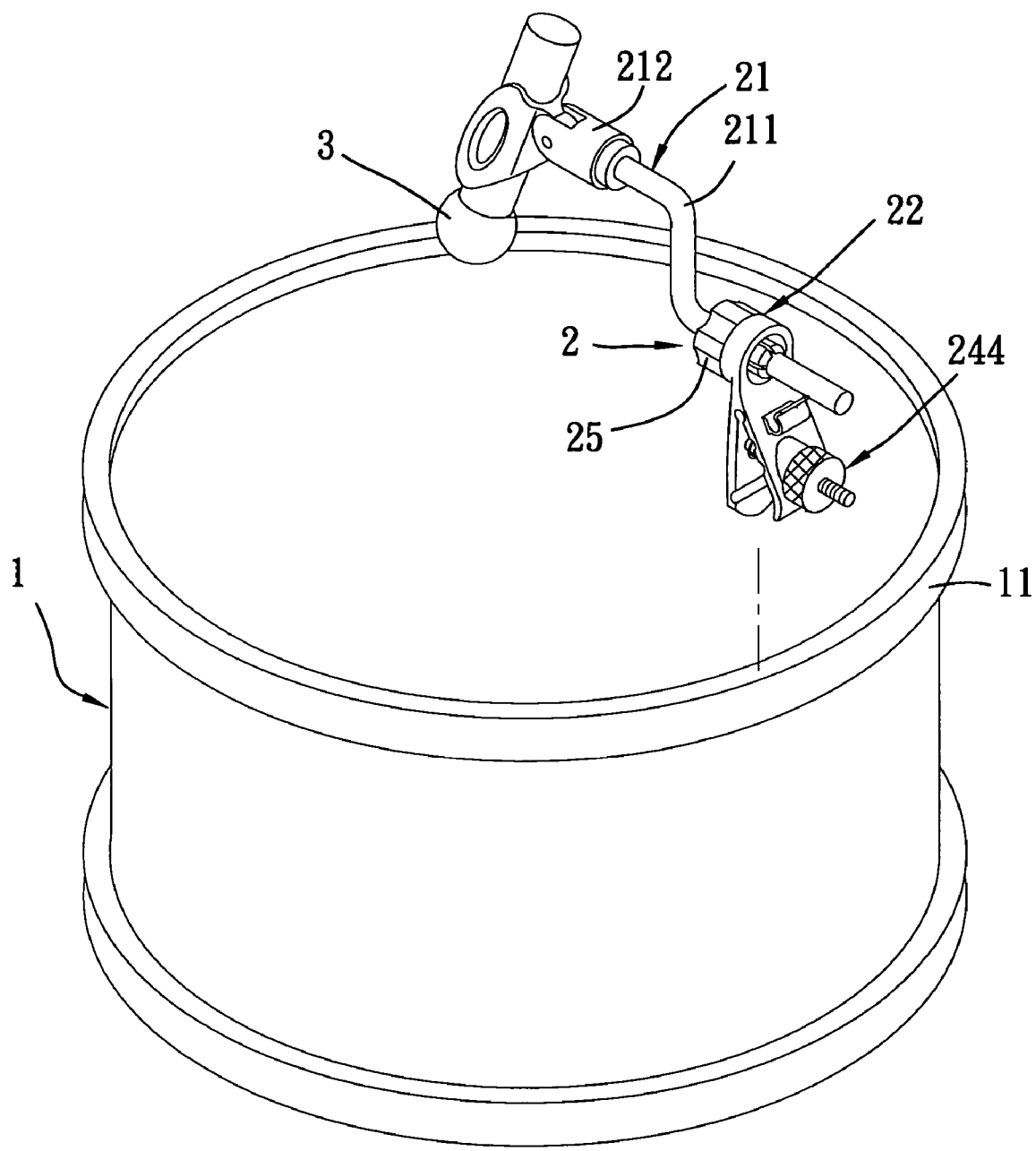
FIG. 1 is a perspective view illustrating a microphone, a drum, and the preferred embodiment of a mounting device according to the present invention.

Referring to FIG. 1, the preferred embodiment of a mounting device 2 according to the present invention is adapted to be installed on a peripheral edge 11 of a musical instrument, such as a drum 1, and is adapted to clamp a microphone 3 thereto so that the microphone 3 is mounted on top of the drum 1.

Figure 2:
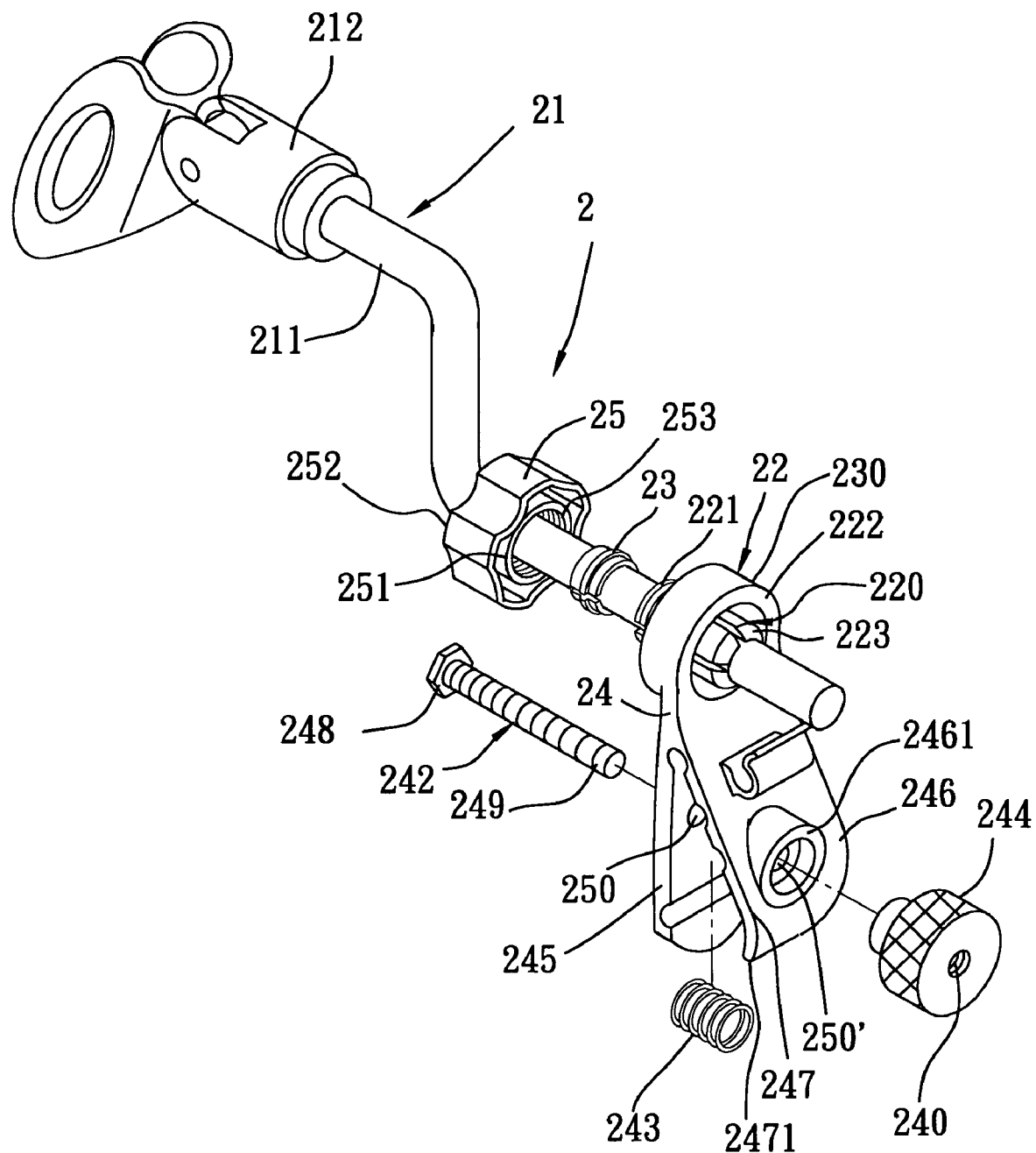
FIG. 2 is a partly exploded perspective view of the preferred embodiment.
Figure 3:
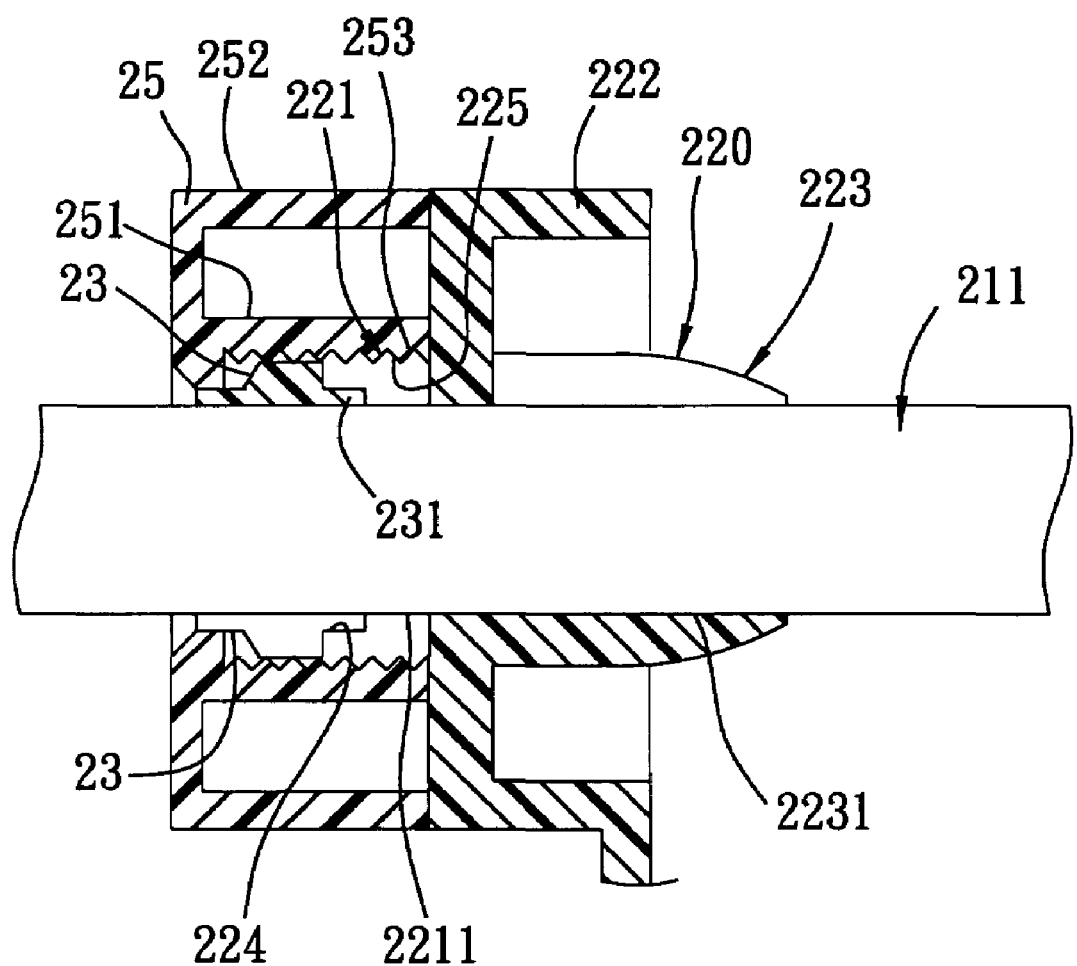
FIG. 3 is a fragmentary sectional view of the preferred embodiment, illustrating connections among a locking unit, a C-shaped friction ring, and a sleeve body of a clamping unit.

Referring to FIGS. 2 and 3, the mounting device 2 of the present invention is shown to comprise a holder 21, a clamping unit 22, a C-shaped friction ring 23, and a locking unit 25.

The holder 21 includes a supporting rod 211 having an offset configuration, and a microphone support 212 fastened to one end of the rod 211 so as to enable mounting of the microphone 3 on top of the drum 1.

The clamping unit 22 is disposed on the rod 211 opposite to the microphone support 212, and includes a seat 222, a pair of spaced-apart first and second clamp arms 246, 245, a threaded shaft 242, a coiled spring 243, and a nut 244. The seat 222 includes a sleeve body 220 which is sleeved around the rod 211, and an outer skirt body 230 integral with and extending around the sleeve body 220. The sleeve body 220 includes a plurality of axially extending first split parts 223, and a plurality of axially extending second split parts 221 that extend in an opposite direction relative to the first split parts 221. The first and second split parts 223, 221 have inner surfaces 2231, 2211 abutting against the rod 211. An external screw thread 225 is formed on outer surfaces of the second split parts 221. The inner surfaces 2211 of the second split parts 221 are recessed at ends of the second split parts 221 to form an annular space 224 around the rod 211.

The first and second clamp arms 246, 245 are adapted to clamp the peripheral edge 11 of the drum 1, and are converged to form a common connection part 24. The common connection part 24 is connected integrally with the outer skirt body 230 of the seat 22 so that the first and second clamp arms 246, 245 and the common connection part 24 are formed as one piece with the seat 22. The second clamp arm 245 is substantially planar with the common connection part 24. The first clamp arm 246 inclines to and extends away from the second clamp arm 245, and forms on a distal end thereof a curved end 247 which is curved toward the second clamp arm 245. The curved end 247 has an inner surface opposite to the second clamp arm 245, and an inward distal edge 2471. The inner surface of the curved end 247 has a protrusion 2472 (see FIG. 4) projecting inward adjacent to the distal edge 2471 and adapted to contact against the peripheral edge 11 of the drum 1. Each of the first and second clamp arms 246, 245 has a through hole 250', 250 for passage of the shaft 242.

The threaded shaft 242 has one end portion 249 that extends through the through hole 250' and out of the first clamp arm 246, and another end portion 248 that extends into the through hole 250 in the second clamp arm 245. The first clamp arm 246 is inclined with respect to the shaft 242, and includes an outer abutment surface 2461 that projects from an outer surface of the first clamp arm 246 at the vicinity of the through hole 250' and that is substantially perpendicular to the shaft 242, and an inner abutment surface 2462 (see FIG. 4) that projects from an inner surface of the first clamp arm 246 at the vicinity of the through hole 250' and that is substantially perpendicular to the shaft 242.

The coiled spring 243 is sleeved on the shaft 242 between the first and second clamp arms 246, 245, and has two opposite ends abutting respectively against an inner surface of the second clamp arm 245 and the inner abutment surface 2462 of the first clamp arm 246.

The nut 244 has an internal screw thread 240 engaged threadedly to the end portion 249 of the shaft 242.

The C-shaped friction ring 23 is sleeved around the rod 211, and has an end 231 extending into the annular space 224.

The locking unit 25 is disposed movably around the rod 211, and includes a tubular member 251 which can be sleeved around the second split parts 221, a hollow knob body 252 extending around and integral with the tubular member 251, and an internal screw thread 253 formed in an inner surface of the tubular member 251 for engagement with the external screw thread 225 so as to tighten the second split parts 221 against the rod 211. The sleeve body 220 is movable along the rod 211, and is lockable against movement upon engagement with the locking unit 25.

Referring to FIG. 4, to install the mounting device 2 of the present invention on the peripheral edge 11 of the drum 1, the clamping unit 22 is first positioned on the drum 1. The nut 244 is then tightened so that it moves toward the first clamp arm 246 until the nut 244 abuts against the outer abutment surface 2461 of the first clamp arm 246. The nut 244 is continuously rotated so as to push the first clamp arm 246 toward the second clamp arm 245. When the first and second clamp arms 246, 245 clamp tightly the peripheral edge 11 of the drum 1, rotation of the nut 244 can be stopped. The coiled spring 243, at this time, is pressed by the first clamp arm 246 so as to store a force.

After the clamping unit 22 is mounted on the peripheral edge 11 of the drum 1, the holder 21 is then mounted on the clamping unit 22. The locking unit 25 and the C-shaped friction ring 23 are sleeved one after the other on the rod 211 prior to insertion of the rod 211 through the sleeve body 220. The rod 211 is then inserted through the sleeve body 220 so as to mount the seat 222 on the rod 211 at a selected position. Next, the end 231 of the friction ring 23 is pushed into the annular space 224 so as to overlap the second split parts 221. Thereafter, the tubular member 251 is moved toward and embraces the friction ring 23 and the second split parts 221, and the internal screw thread 253 of the tubular member 251 is engaged with the external screw thread 225 of the second split parts 221. At this time, the friction ring 23 is disposed between the second split parts 221 and the tubular member 251. Accordingly, the inner surfaces 2211 of the first split parts 221 abut tightly against the rod 211, and the sleeve body 220 is locked against the rod 211. The microphone support 212 is then fastened to the rod 211 opposite to the clamping unit 22. The microphone 3 is subsequently mounted on the microphone support 212, and some adjustments can be made so as to suitably position the microphone 3 relative to the drum 1.

Referring to FIG. 5, when the nut 244 is loosened, the coiled spring 243 releases the stored force so as to push the first clamp arm 246 away from the second clamp arm 245, thereby facilitating removal of the mounting device 2 of the present invention from the peripheral edge 11 of the drum 1.

From the aforementioned description of the preferred embodiment, the advantages of the mounting device 2 of the present invention can be summarized as follows:

1. Through the insertion of the end 231 of the friction ring 23 into the annular space 224 to overlap the friction ring 23 with the second split parts 221, and through the engagement of the locking unit 25 with the friction ring 23 and the second split parts 221, the rod 211 can be positioned stably on the clamping unit 22, which in turn can effectively position the microphone 3 on top of the drum 1.

2. Through the configurations of the first and second split parts 223, 221, which provide a significant amount of expandability, smooth insertion of the rod 211 is made possible, and the sleeve body 220 can accommodate a wide range of diameters of the rod 211.

3. When the first and second clamp arms 246, 245 clamp the peripheral edge 11 of the drum 1, the vibration produced during use of the drum 1 is effectively absorbed by the coiled spring 243 due to its inherent ability to absorb shocks, thereby preventing excessive movement of the microphone 3 so that the microphone 3 operates more effectively. While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A mounting device for mounting a microphone on a musical instrument having a peripheral edge, said mounting device comprising:

a holder adapted to hold the microphone and having a rod; and a clamping unit including a seat mounted on said rod, a pair of spaced-apart first and second clamp arms which is adapted to clamp the peripheral edge of the musical instrument and which are converged to form a common connection part connected to said seat, a shaft extending through said first and second clamp arms and having one end portion extending outwardly of said first clamp arm, and a nut threadedly engaging said one end portion of said shaft to bias said first clamp arm toward said second clamp arm, wherein said first and second clamp arms and said common connection part are formed as one piece with said seat, said second clamp arm being substantially planar with said common connection part, said first clamp arm being inclined with respect to and extending away from said second clamp arm and then forming a curved end which is curved toward said second clamp arm; and wherein said curved end has an inner surface opposite to said second clamp arm, and an inward distal edge adapted to contact against the peripheral edge of the musical instrument, said inner surface having a protrusion projecting inwardly adjacent to said distal edge and adapted to contact against the peripheral edge of the musical instrument.

2. The mounting device as claimed in claim 1, wherein said first clamp arm is inclined with respect to said shaft and includes a hole for passage of said shaft, and an outer abutment surface projecting from an outer surface of said first clamp arm at the vicinity of said hole and substantially perpendicular to said shaft for abutment with said nut.

3. The mounting device as claimed in claim 2, wherein said clamping unit further includes a coiled spring sleeved on said shaft between said first and second clamp arms, said first clamp arm further having an inner abutment surface projecting from an inner surface of said first clamp arm at the vicinity of said hole and substantially perpendicular to said shaft for abutment with said spring.

4. A mounting device for mounting a microphone on a musical instrument having a peripheral edge, said mounting device comprising:
  a holder adapted to hold the microphone and having a rod; and
  a clamping unit including a seat mounted on said rod, a pair of spaced-apart first and second clamp arms which is adapted to clamp the peripheral edge of the musical instrument and which are converged to form a common connection part connected to said seat, a shaft extending through said first and second clamp arms and having one end portion extending outwardly of said first clamp arm, and a nut threadedly engaging said one end portion of said shaft to bias said first clamp arm toward said second clamp arm, wherein said first and second clamp arms and said common connection part are formed as one piece with said seat, said second clamp arm being substantially planar with said common connection part, said first clamp arm being inclined with respect to and extending away from said second clamp arm and then forming a curved end which is curved toward said second clamp arm; and
  wherein said seat includes a sleeve body which is sleeved around said rod, and an outer skirt body integral with and extending around said sleeve body, said common connection part of said first and second clamp arms being connected integrally with said outer skirt body.

5. A mounting device for mounting a microphone on a musical instrument having a peripheral edge, said mounting device comprising:
  a holder adapted to hold the microphone and having a rod;
  a clamping unit including a seat mounted on said rod, a pair of spaced-apart first and second clamp arms which is adapted to clamp the peripheral edge of the musical instrument and which are converged to form a common connection part connected to said seat, a shaft extending through said first and second clamp arms and having one end portion extending outwardly of said first clamp arm, and a nut threadedly engaging said one end portion of said shaft to bias said first clamp arm toward said second clamp arm; and
  a locking unit movably disposed around said rod, said seat having a sleeve body which is sleeved around said rod, said sleeve body being movable along said rod and being lockable against movement upon engagement with said locking unit.

6. The mounting device as claimed in claim 5, wherein said sleeve body includes a plurality of axially extending split parts formed around said rod, and an external screw thread formed on outer surfaces of said split parts, said locking unit including a tubular member which can be sleeved around said split parts and which has an internal screw thread engageable with said external screw thread to tighten said split parts against said rod.

7. The mounting device as claimed in claim 6, wherein said split parts have inner surfaces abutting against said rod, said inner surfaces of said split parts being recessed at ends of said split parts to form an annular space around said rod.

8. The mounting device as claimed in claim 7, further comprising a C-shaped friction ring sleeved around said rod, said C-shaped friction ring having one end extending into said annular space, said tubular member embracing said friction ring and said split parts when said internal and external screw threads are interengaged.

9. The mounting device as claimed in claim 8, wherein said locking unit further includes a hollow knob body extending around and integral with said tubular member.

10. An assembly comprising:
  a holder having a rod;
  a seat mountable on said rod at a selected position, and including a sleeve body which is sleeved movably around said rod and which has a plurality of axially extending split parts formed around said rod, and an external screw thread formed on outer surfaces of said split parts;
  a locking unit disposed movably around said rod and engageable with said sleeve body to lock said sleeve body against movement, said locking unit including a tubular member which can be sleeved around said split parts and which has an internal screw thread engageable with said external screw thread to lock said split parts against movement; and
  a C-shaped friction ring sleeved around said rod between said sleeve body and said tubular member, said C-shaped friction ring having one end engaging said split parts, said tubular member embracing said friction ring and said split parts when said internal and external screw threads are interengaged.

11. The assembly as claimed in claim 10, wherein said locking unit further includes a hollow knob body extending around and integral with said tubular member.

12. The assembly as claimed in claim 10, wherein said split parts have inner surfaces contacting said rod, said inner surfaces of said split parts being recessed at ends of said split parts to form an annular space around said rod, said one end of said friction ring extending into said annular space.

* * * * *